(12) United States Patent
Chou

(10) Patent No.: US 7,822,239 B2
(45) Date of Patent: Oct. 26, 2010

(54) FINGERPRINT SENSING DEVICE HAVING FLEXIBLE PRINTED CIRCUIT BOARD SERVING AS SIGNAL TRANSMISSION STRUCTURE AND THE METHOD OF MANUFACTURING THE SAME

(75) Inventor: Bruce C. S. Chou, Hsin Chu (TW)

(73) Assignee: Egis Technology, Inc., Taipei (TW)

( * ) Notice: Subject to any disclaimer, the term of this patent is extended or adjusted under 35 U.S.C. 154(b) by 162 days.

(21) Appl. No.: 12/187,554

(22) Filed: Aug. 7, 2008

(65) Prior Publication Data
US 2009/0039449 A1    Feb. 12, 2009

(30) Foreign Application Priority Data
Aug. 10, 2007    (TW) ............... 96129497 A

(51) Int. Cl.
*G06K 9/28*    (2006.01)

(52) U.S. Cl. ..................... 382/124

(58) Field of Classification Search .............. None
See application file for complete search history.

(56) References Cited

U.S. PATENT DOCUMENTS

| | | | | |
|---|---|---|---|---|
| 4,353,056 A | * | 10/1982 | Tsikos ........................ | 382/124 |
| 5,060,527 A | * | 10/1991 | Burgess ................... | 73/862.68 |
| 5,325,442 A | * | 6/1994 | Knapp ....................... | 382/124 |
| 5,972,152 A | * | 10/1999 | Lake et al. .................. | 156/247 |
| 6,714,666 B1 | * | 3/2004 | Morimura et al. ........... | 382/124 |
| 6,759,264 B2 | | 7/2004 | Chou | |
| 7,021,158 B2 | * | 4/2006 | Shimizu et al. ........ | 73/862.041 |
| 7,099,497 B2 | | 8/2006 | Chou | |
| 7,250,774 B2 | * | 7/2007 | Oka ........................... | 324/671 |
| 2004/0046574 A1 | | 3/2004 | Chou | |
| 2004/0208345 A1 | * | 10/2004 | Chou et al. .................. | 382/124 |
| 2006/0273417 A1 | * | 12/2006 | Ganapathi et al. ........... | 257/415 |
| 2007/0086630 A1 | * | 4/2007 | Setlak et al. ................ | 382/124 |
| 2008/0093687 A1 | * | 4/2008 | Antaki ....................... | 257/415 |
| 2008/0122054 A1 | * | 5/2008 | Szewerenko et al. ........ | 257/679 |
| 2008/0219521 A1 | * | 9/2008 | Benkley et al. ............. | 382/124 |

FOREIGN PATENT DOCUMENTS

| | | |
|---|---|---|
| TW | 541503 | 5/2001 |
| WO | WO 2007/047748 A1 | 4/2007 |

* cited by examiner

*Primary Examiner*—Brian P Werner
(74) *Attorney, Agent, or Firm*—Muncy, Geissler, Olds & Lowe, PLLC

(57) ABSTRACT

A fingerprint sensing device includes a chip substrate, first connecting pads and a flexible printed circuit board. The substrate has fingerprint sensing cells. The first connecting pads are respectively disposed on the fingerprint sensing cells and exposed from a top surface of the substrate. The printed circuit board is disposed above the substrate and has signal transmission structures exposed from a bottom surface of the printed circuit board. The fingerprint sensing cells are respectively electrically connected to the signal transmission structures, and a top surface of the printed circuit board serves as a contact surface for a finger so that sensed fingerprint signals of the finger are transmitted to the fingerprint sensing cells through the signal transmission structures. The numbers of the first connecting pads, the fingerprint sensing cells and the signal transmission structures are equal to one another. A method of manufacturing the fingerprint sensing device is also disclosed.

20 Claims, 4 Drawing Sheets

FINGERPRINT SENSING DEVICE HAVING FLEXIBLE PRINTED CIRCUIT BOARD SERVING AS SIGNAL TRANSMISSION STRUCTURE AND THE METHOD OF MANUFACTURING THE SAME

This application claims priority of No. 096129497 filed in Taiwan R.O.C. on Aug. 10, 2007 under 35 USC 119, the entire content of which is hereby incorporated by reference.

BACKGROUND OF THE INVENTION

1. Field of Invention

The invention relates in general to a fingerprint sensing device, and more particularly to a fingerprint sensing device with a flexible printed circuit board and a method of manufacturing the same.

2. Related Art

Most non-optical fingerprint sensors are designed and formed on silicon chips or wafers. The basic structure of each of the capacitive, electric field, RF or thermal sensing chip or other sensing chips includes a sensing cell array, which is formed above the silicon chip and can be in direct contact with the finger to measure the finger ridge or the finger valley images. The technology associated with the fingerprint sensing chip may be found in the following patents proposed by the present inventor: (a) U.S. patent application Ser. No. 10/403,052, filed on Apr. 1, 2003, entitled "CAPACITIVE FINGERPRINT SENSOR", and issued on Aug. 29, 2006 as U.S. Pat. No. 7,099,497; (b) U.S. patent application Ser. No. 10/434,833, filed on May 13, 2003, entitled "PRESSURE TYPE FINGERPRINT SENSOR FABRICATION METHOD", and issued on Jul. 6, 2004 as U.S. Pat. No. 6,759,264; (c) U.S. patent application Ser. No. 10/414,214 (US20040208345A1), filed on Apr. 16, 2003, and entitled "THERMOELECTRIC SENSOR FOR FINGERPRINT THERMAL IMAGING"; (d) U.S. patent application Ser. No. 10/638,371 (US20040046574A1), filed on Aug. 12, 2003, and entitled "CAPACITIVE MICRO PRESSURE SENSING MEMBER AND FINGERPRINT SENSOR USING THE SAME"; and (e) Taiwan Patent Application No. 090112023, filed on May 17, 2001, and entitled "CAPACITIVE PRESSURE MICROSENSOR AND METHOD FOR MANUFACTURING THE SAME AND DETECTING SIGNALS OF THE SAME", now published as TW541503 and issued as Invention Patent Number 182652.

For a complete sensor structure, an insulating layer to be in contact with the finger is always formed on a surface of the chip to prevent the surface of the chip from being worn out by the finger. Because the insulating layer of the fingerprint chip is usually formed by way of film deposition and most insulating layers are made of fragile dielectric materials, the insulating layer on the surface of the chip cannot withstand a large pressure or an impact of force. In addition, the insulating layer formed in the film manufacturing process is usually too thin to achieve a long-term, good wearing resistance.

Furthermore, when the object with the electrostatic charges approaches to the chip, the electrostatic charges may be discharged through the surface of the chip and thus the chip may be damaged. The reason is that the insulating layer is too thin so that the ability of the chip for withstanding the electrostatic charge damage is restricted.

Thus, it is an important subject of the invention to provide a fingerprint sensing chip capable of withstanding the pressure, force impact, wearing and the electrostatic charge damage, and a method of manufacturing the same so that the problems in the related art can be solved.

SUMMARY OF THE INVENTION

It is therefore an object of the invention to provide a fingerprint sensing device having a flexible printed circuit board, and a method of manufacturing the same so that the good properties of withstanding the pressure, force impact, wearing and the electrostatic charge damage can be provided.

The invention achieves the above-identified object by providing a fingerprint sensing chip including a chip substrate, a plurality of first connecting pads and a flexible printed circuit board. The chip substrate has a plurality of fingerprint sensing cells. The first connecting pads are respectively disposed on the fingerprint sensing cells and exposed from a top surface of the chip substrate. The flexible printed circuit board is disposed above the chip substrate and has a plurality of signal transmission structures exposed from a bottom surface of the flexible printed circuit board. The fingerprint sensing cells are respectively electrically connected to the signal transmission structures. A top surface of the flexible printed circuit board serves as a contact surface for a finger so that sensed fingerprint signals of the finger are respectively transmitted to the fingerprint sensing cells through the signal transmission structures. The numbers of the first connecting pads, the fingerprint sensing cells and the signal transmission structures are equal to on another.

The invention also provides a method of manufacturing a fingerprint sensing chip. The method includes the steps of: providing a chip substrate having a plurality of fingerprint sensing cells; forming a plurality of first connecting pads on the fingerprint sensing cells, respectively, wherein the first connecting pads are exposed from a top surface of the chip substrate; providing a flexible printed circuit board disposed above the chip substrate, wherein the flexible printed circuit board has a plurality of signal transmission structures exposed from a bottom surface of the flexible printed circuit board; and bonding the flexible printed circuit board onto the chip substrate to make the fingerprint sensing cells be respectively electrically connected to the signal transmission structures. A top surface of the flexible printed circuit board serves as a contact surface for a finger so that sensed fingerprint signals of the finger are respectively transmitted to the fingerprint sensing cells through the signal transmission structures. The numbers of the first connecting pads, the fingerprint sensing cells and the signal transmission structures are equal to one another.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention.

DETAILED DESCRIPTION OF THE INVENTION

The present invention will be apparent from the following detailed description, which proceeds with reference to the accompanying drawings, wherein the same references relate to the same elements.

Figure 1:
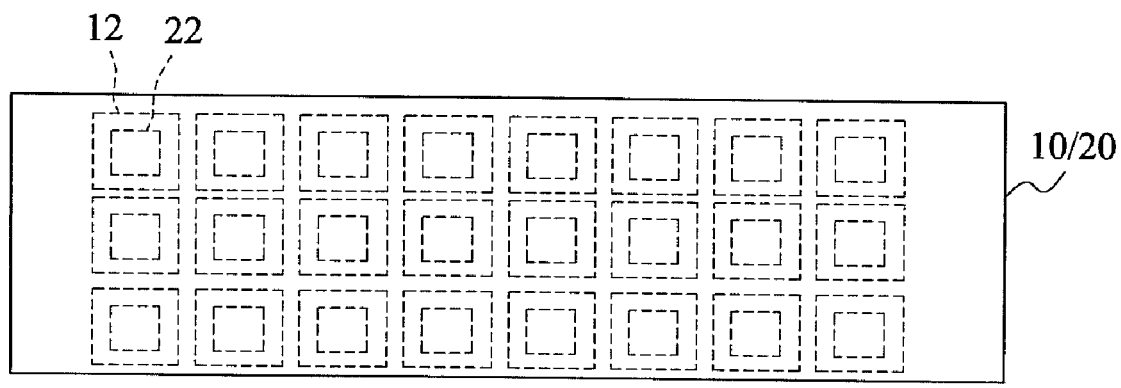
FIG. 1 is a partial top view showing a fingerprint sensing device according to the invention.
Figure 2:
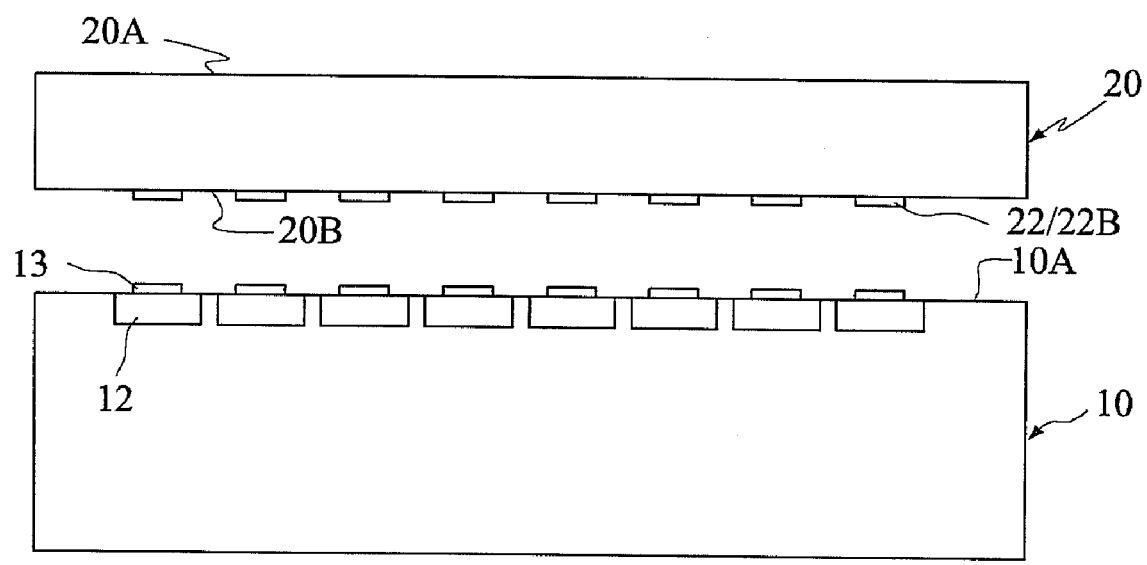
FIGS. 2 and 3 are side views showing steps of manufacturing a fingerprint sensing device according to a first embodiment of the invention.
Figure 3:
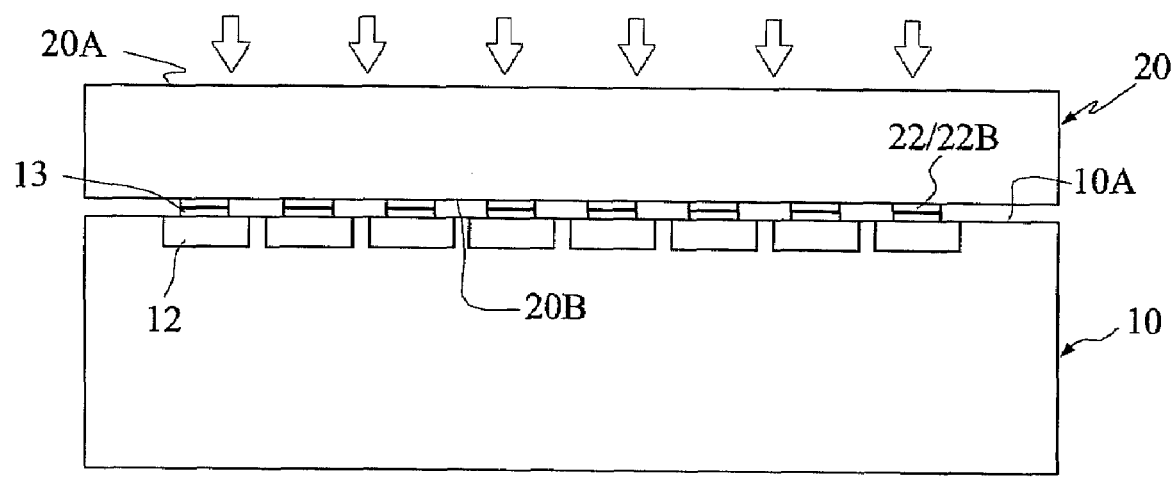
Figure 4:
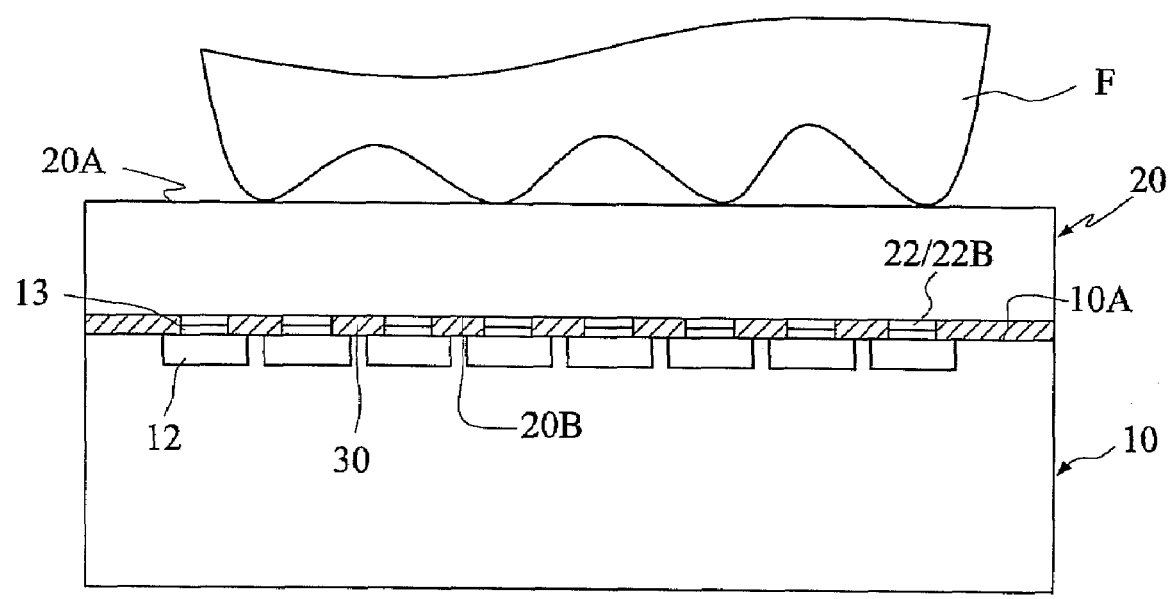
FIG. 4 is a side view showing an application of the fingerprint sensing device according to the first embodiment of the invention.

FIG. 1 is a partial top view showing a fingerprint sensing device according to the invention. Although the array shown in FIG. 1 is composed of a plurality of sensing cells 12, the number of the sensing cells of the array is not particularly restricted. FIGS. 2 and 3 are side views showing steps of manufacturing a fingerprint sensing device according to a first embodiment of the invention. FIG. 4 is a side view showing an application of the fingerprint sensing device according to the first embodiment of the invention. Referring to FIGS. 1 to 4, the method of manufacturing the fingerprint sensing device of this embodiment includes the following steps.

First, a chip substrate 10 is provided. The chip substrate 10 is usually made of a silicon material, and may also be made of other semiconductor materials or insulating materials, such as glass. The chip substrate 10 has a plurality of fingerprint sensing cells 12, as shown in FIG. 2. Each fingerprint sensing cell 12 may be a capacitive fingerprint sensing cell, a pressure-type fingerprint sensing cell, a thermal fingerprint sensing cell, an electric-field fingerprint sensing cell, an RF fingerprint transceiver cell, an infrared or optical sensing cell or any other sensing cell based on other sensing Physics.

Next, first connecting pads 13 are formed on the fingerprint sensing cells 12, respectively. The first connecting pads 13 are exposed from a top surface 10A of the chip substrate 10, as shown in FIG. 2. The connecting pads 13 may be formed by plating metal, such as gold, on a surface of a wafer or chip. Of course, the material of the connecting pad 13 of the invention may be selected from, without limitation to, the group consisting of a metal material, an electroconductive polymer, or an anisotropic electroconductive film (ACF) material.

Figure 7:
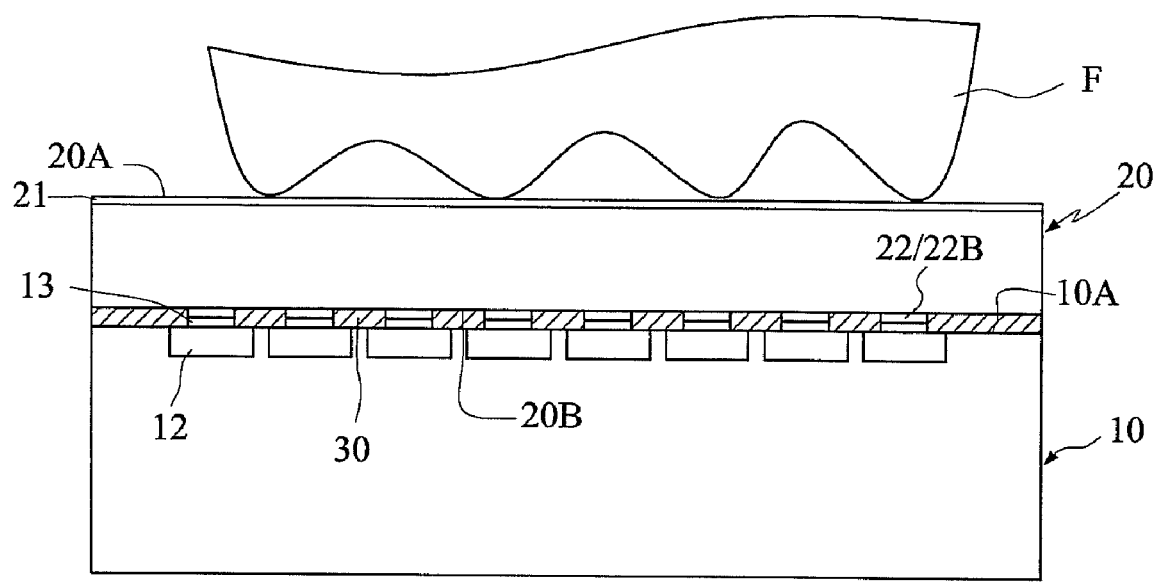
FIG. 7 is a side view showing an application of a fingerprint sensing device according to a fourth embodiment of the invention.

Then, a flexible printed circuit board 20, having a plurality of signal transmission structures 22 exposed from a bottom surface 20B of the flexible printed circuit board 20, is provided and disposed above the chip substrate 10, as shown in FIG. 2. In this embodiment, the thickness of the flexible printed circuit board 20 ranges from 10 to 100 microns. In this embodiment, the material of the flexible printed circuit board may be, without limitation to, the polyimide having the good manufacturing stability and the good environment stability. Meanwhile, the flexible printed circuit board 20 may further include an anti-contamination material layer 21 having the good wearing-resistant property or the hydrophobic or oleophobic properties, as shown in FIG. 7, to prevent a latent fingerprint and any contamination from being remained thereon. The anti-contamination material layer 21 may be made of, for example, resin or epoxy so that the surface hardness can be enhanced. The anti-contamination material layer 21 may be made of, without limitation to, a wearing-resistant material, a hydrophobic material or an oleophobic material.

Therefore, in this invention, the thickness of the total polymer layers including polyimide and anti-contamination layer is far greater than that of the insulating film formed by the conventional film forming process. So, the good properties of withstanding the pressure, the force impact, wearing and electrostatic charge damage can be provided in the fingerprint sensing device.

Finally, the flexible printed circuit board 20 is bonded onto the chip substrate 10 by way of, hot pressing, for example, as shown in FIG. 3. Thus, the fingerprint sensing cells 12 may be respectively electrically connected to the signal transmission structures 22, and a top surface 20A of the flexible printed circuit board 20 may serve as a contact surface for a finger F so that sensed fingerprint signals of the finger F can be respectively transmitted to the fingerprint sensing cells 12 via the signal transmission structures 22, as shown in FIG. 4. The numbers of the first connecting pads 13, the fingerprint sensing cells 12 and the signal transmission structures 22 are equal to one another.

Therefore, the fingerprint sensing device of this embodiment includes the chip substrate 10, the plurality of first connecting pads 13 and the flexible printed circuit board 20. The chip substrate 10 has the plurality of fingerprint sensing cells 12. The first connecting pads 13 are respectively disposed on the fingerprint sensing cells 12 and exposed from the top surface 10A of the chip substrate 10. The flexible printed circuit board 20 is disposed above the chip substrate 10, and has the plurality of signal transmission structures 22 exposed from the bottom surface 20B of the flexible printed circuit board 20. The fingerprint sensing cells 12 are respectively electrically connected to the signal transmission structures 22, and the top surface 20A of the flexible printed circuit board 20 serves as the contact surface for the finger F so that the sensed fingerprint signals of the finger F are transmitted to the fingerprint sensing cells 12 through the signal transmission structures 22.

Referring to FIG. 4, the fingerprint sensing device of this embodiment may further include an underfill layer 30, which is filled between the top surface 10A of the chip substrate 10 and the bottom surface 20B of the flexible printed circuit board 20 and covers the fingerprint sensing cells 12. Thus, the method of this embodiment may further include the steps of: filling the underfill layer 30 between the top surface 10A of the chip substrate 10 and the bottom surface 20B of the flexible printed circuit board 20 with the underfill layer 30 covering the fingerprint sensing cells 12. It is to be noted that the underfill layer 30 may also be omitted.

Also, each signal transmission structure 22 may only include, without limitation to, an exposed second connecting pad 22B, wherein this structure may be referred to as a single-metal layer flexible printed circuit board. The second connecting pads 22B are respectively electrically connected to the fingerprint sensing cells 12. Therefore, the step of providing the flexible printed circuit board 20 may include: forming the plurality of exposed second connecting pads 22B to be respectively electrically connected to the fingerprint sensing cells 12.

Figure 5:
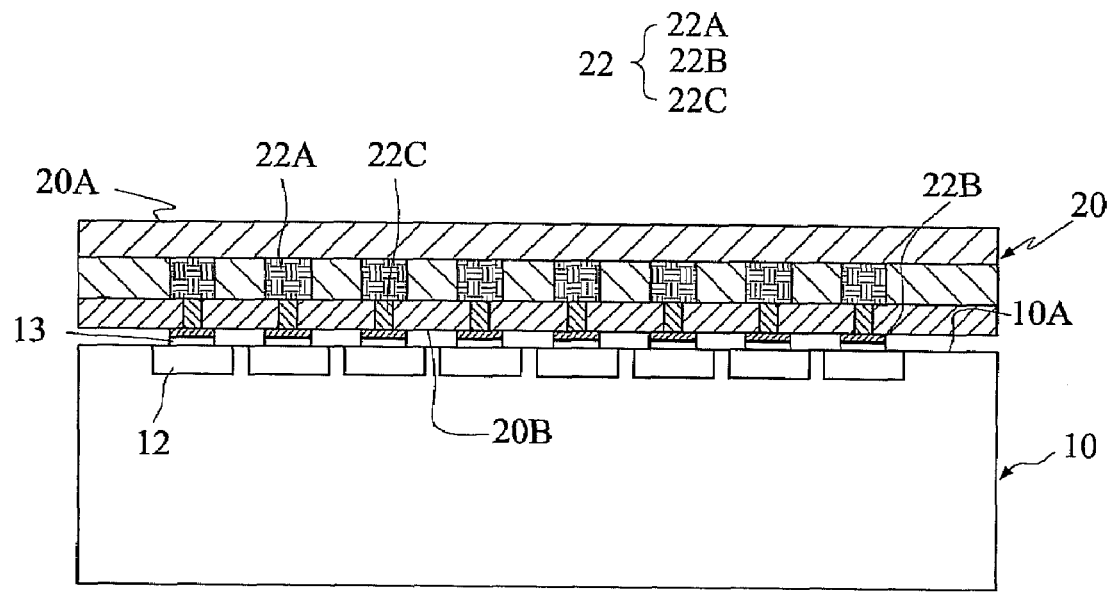
FIG. 5 is a partially cross-sectional view showing a fingerprint sensing device according to a second embodiment of the invention.

FIG. 5 is a partially cross-sectional view showing a fingerprint sensing device according to a second embodiment of the invention. As shown in FIG. 5, each signal transmission structure 22 of the flexible printed circuit board 20 of this embodiment includes, without limitation to, a metal electrode 22A, an exposed second connecting pad 22B and a metal plug 22C. The metal electrode 22A is embedded into the flexible printed circuit board 20. The exposed second connecting pad 22B is formed on the bottom surface 20B of the flexible printed circuit board 20. The metal plug 22C is formed inside the flexible printed circuit board 20 to electrically connect the metal electrode 22A to the second connecting pad 22B.

Figure 6:
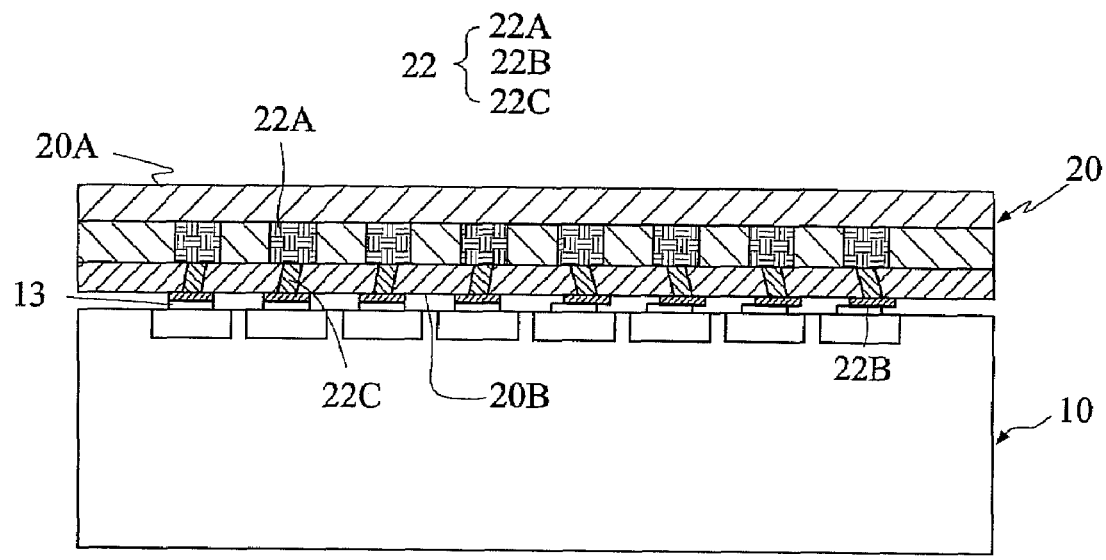
FIG. 6 is a partially cross-sectional view showing a fingerprint sensing device according to a third embodiment of the invention.

In this embodiment, a first pitch of the metal electrodes 22A is equal to a second pitch of the sensing cells 12. The first pitch represents the distance between center points of two adjacent metal electrodes 22A, and the second pitch represents the distance between center points of two adjacent sensing cells 12. However, the invention is not restricted thereto. The first pitch of the metal electrodes 22A may be smaller than the second pitch of the sensing cells 12, as shown in FIG. 6. Similarly, the first pitch of the metal electrodes 22A may be greater than the second pitch of the sensing cells 12.

Also, in order to enhance the capability of the sensing device for withstanding the electrostatic discharge (ESD), an electroconductive layer may be selectively formed. The electroconductive layer forms a portion of a top surface of the flexible printed circuit board. So, the electroconductive layer is exposed outside. The electroconductive layer includes, without limitation to, a metal layer, and is disposed around the signal transmission structures, to discharge the electrostatic charges of the approaching object or finger. The electroconductive layer can keep the normal operation of the sensing device through the suitable electrical layout, which includes, without limitation to, the layout of grounding the electroconductive layer.

Also, the exposed electroconductive layer may drive some active signal, such as the RF or other electromagnetic wave, to enhance the sensitivity of the sensor cell.

According to the embodiment of the invention, it is possible to provide a fingerprint sensing device capable of withstanding the pressure, the force impact, wearing and the electrostatic charge damage, and a method of manufacturing the same so that the conventional problems can be effectively solved.

While the invention has been described by way of examples and in terms of preferred embodiments, it is to be understood that the invention is not limited thereto. To the contrary, it is intended to cover various modifications. Therefore, the scope of the appended claims should be accorded the broadest interpretation so as to encompass all such modifications.

What is claimed is:

1. A fingerprint sensing device, comprising:
    a chip substrate having a plurality of fingerprint sensing cells;
    a plurality of first connecting pads respectively disposed on the fingerprint sensing cells and exposed from a top surface of the chip substrate; and
    a flexible printed circuit board disposed above the chip substrate and having a plurality of signal transmission structures exposed from a bottom surface of the flexible printed circuit board, wherein the fingerprint sensing cells are respectively electrically connected to the signal transmission structures, a top surface of the flexible printed circuit board serves as a contact surface for a finger so that sensed fingerprint signals of the finger are respectively transmitted to the fingerprint sensing cells through the signal transmission structures, and the numbers of the first connecting pads, the fingerprint sensing cells and the signal transmission structures are equal to one another.

2. The fingerprint sensing device according to claim 1, further comprising:
    an underfill layer, which is filled between the top surface of the chip substrate and the bottom surface of the flexible printed circuit board, and covers the fingerprint sensing cells.

3. The fingerprint sensing device according to claim 1, wherein each of the signal transmission structures comprises an exposed second connecting pad, and the second connecting pads are respectively electrically connected to the fingerprint sensing cells.

4. The fingerprint sensing device according to claim 1, wherein each of the fingerprint sensing cells is a capacitive fingerprint sensing cell, a pressure-type fingerprint sensing cell, a thermal fingerprint sensing cell, an electric-field fingerprint sensing cell, an RF fingerprint transceiver cell, an infrared fingerprint sensing cell or an optical fingerprint sensing cell.

5. The fingerprint sensing device according to claim 1, wherein each of the signal transmission structures of the flexible printed circuit board comprises:
    a metal electrode embedded into the flexible printed circuit board;
    an exposed second connecting pad formed on the bottom surface of the flexible printed circuit board; and
    a metal plug, formed inside the flexible printed circuit board, for electrically connecting the metal electrode to the second connecting pad.

6. The fingerprint sensing device according to claim 5, wherein a first pitch of the metal electrodes is greater than a second pitch of the fingerprint sensing cells.

7. The fingerprint sensing device according to claim 5, wherein a first pitch of the metal electrodes is smaller than a second pitch of the fingerprint sensing cells.

8. The fingerprint sensing device according to claim 5, wherein a first pitch of the metal electrodes is equal to a second pitch of the fingerprint sensing cells.

9. The fingerprint sensing device according to claim 1, wherein the flexible printed circuit board further has an anti-contamination material layer formed on the top surface of the flexible printed circuit board to prevent a latent fingerprint or any contamination from being remained.

10. The fingerprint sensing device according to claim 9, wherein the anti-contamination material layer is composed of a wearing-resistant material, a hydrophobic material or an oleophobic material.

11. The fingerprint sensing device according to claim 1, wherein the flexible printed circuit board further has an electroconductive layer, which forms a portion of the top surface of the flexible printed circuit board to discharge electrostatic charges of the finger.

12. A method of manufacturing a fingerprint sensing device, the method comprising the steps of:
    providing a chip substrate having a plurality of fingerprint sensing cells;
    forming a plurality of first connecting pads on the fingerprint sensing cells, respectively, wherein the first connecting pads are exposed from a top surface of the chip substrate;
    providing a flexible printed circuit board disposed above the chip substrate, wherein the flexible printed circuit board has a plurality of signal transmission structures exposed from a bottom surface of the flexible printed circuit board; and
    bonding the flexible printed circuit board onto the chip substrate to make the fingerprint sensing cells be respectively electrically connected to the signal transmission structures, wherein a top surface of the flexible printed circuit board serves as a contact surface for a finger so that sensed fingerprint signals of the finger are respectively transmitted to the fingerprint sensing cells through the signal transmission structures, and the numbers of the first connecting pads, the fingerprint sensing cells and the signal transmission structures are equal to one another.

13. The method according to claim 12, further comprising the steps of:

filling an underfill layer between the top surface of the chip substrate and the bottom surface of the flexible printed circuit board with the underfill layer covering the fingerprint sensing cells.

14. The method according to claim 12, wherein the step of providing the flexible printed circuit board comprises:

forming a plurality of exposed second connecting pads to be respectively electrically connected to the fingerprint sensing cells.

15. The method according to claim 12, wherein each of the fingerprint sensing cells is a capacitive fingerprint sensing cell, a pressure-type fingerprint sensing cell, a thermal fingerprint sensing cell, an electric-field fingerprint sensing cell, an RF fingerprint transceiver cell, an infrared fingerprint sensing cell or an optical fingerprint sensing cell.

16. The method according to claim 12, wherein each of the signal transmission structures of the flexible printed circuit board comprises:

a metal electrode embedded into the flexible printed circuit board;

an exposed second connecting pad formed on the bottom surface of the flexible printed circuit board; and a metal plug, formed inside the flexible printed circuit board, for electrically connecting the metal electrode to the second connecting pad.

17. The method according to claim 16, wherein a first pitch of the metal electrodes is greater than a second pitch of the fingerprint sensing cells.

18. The method according to claim 16, wherein a first pitch of the metal electrodes is smaller than a second pitch of the fingerprint sensing cells.

19. The method according to claim 16, wherein a first pitch of the metal electrodes is equal to a second pitch of the fingerprint sensing cells.

20. The method according to claim 12, wherein the flexible printed circuit board further has an anti-contamination material layer formed on the top surface of the flexible printed circuit board to prevent a latent fingerprint or any contamination from being remained.

* * * * *